(12) United States Patent
Bennett

(10) Patent No.: US 6,227,173 B1
(45) Date of Patent: May 8, 2001

(54) FUEL LINE ARRANGEMENT FOR LPG SYSTEM, AND METHOD

(75) Inventor: David E. Bennett, Lake Lillian, MN (US)

(73) Assignee: Bi-Phase Technologies, L.L.C., Lake Lillian, MN (US)

(*) Notice: Subject to any disclaimer, the term of this patent is extended or adjusted under 35 U.S.C. 154(b) by 0 days.

(21) Appl. No.: 09/328,281

(22) Filed: Jun. 7, 1999

(51) Int. Cl.$^7$ .................................................. F02M 55/02
(52) U.S. Cl. ........................................... 123/468; 123/541
(58) Field of Search ................................... 123/468, 541, 123/527, 41.31, 1 A, 540, 456

(56) References Cited

U.S. PATENT DOCUMENTS

| | | | |
|---|---|---|---|
| 1,860,063 | 5/1932 | Tobler | 123/32 |
| 1,966,223 | 7/1934 | Sass | 123/32 |
| 2,244,800 | 6/1941 | Pascale | 123/32 |
| 2,264,914 | 12/1941 | L'Orange | 299/107.1 |
| 2,286,658 | 6/1942 | Voit | 123/32 |
| 2,475,635 | 7/1949 | Parsons | 138/65 |
| 2,886,014 | 5/1959 | Konrad et al. | 299/107.1 |
| 2,965,303 | 12/1960 | Jackson | 239/132 |
| 2,978,797 | 4/1961 | Ekelund | 29/157.3 |
| 3,398,895 | 8/1968 | Claffey | 239/132.3 |
| 3,450,351 | 6/1969 | Messerschmidt | 239/533 |
| 3,451,627 | 6/1969 | Barber | 239/533 |
| 3,612,012 | 10/1971 | Dreisin | 123/32 |
| 3,945,353 | 3/1976 | Dreisin | 123/41.22 |
| 3,958,757 | 5/1976 | Happel et al. | 239/125 |
| 4,099,496 | 7/1978 | Nagase et al. | 123/41.31 |
| 4,421,087 | 12/1983 | Schuurman | 123/445 |
| 4,434,765 | 3/1984 | Eshelman | 123/472 |
| 4,471,909 | 9/1984 | Perr | 239/89 |
| 4,489,700 | 12/1984 | van der Weide | 123/527 |
| 4,503,826 | 3/1985 | Kessler et al. | 123/470 |
| 4,503,831 | 3/1985 | Rijkeboer | 125/525 |
| 4,503,832 | 3/1985 | Pefley et al. | 123/525 |
| 4,545,345 | 10/1985 | Pagdin et al. | 123/299 |
| 4,570,602 | 2/1986 | Atkins et al. | 123/468 |
| 4,676,478 | 6/1987 | Kiuchi | 251/129.08 |
| 4,700,891 | 10/1987 | Hans et al. | 239/132.5 |
| 4,704,591 | 11/1987 | Hafner | 335/229 |
| 4,768,492 | 9/1988 | Widmer et al. | 123/541 |
| 4,796,924 | 1/1989 | Kosugi et al. | 285/39 |
| 4,886,305 | 12/1989 | Martin | 85/133.1 |
| 4,901,974 | 2/1990 | Cook et al. | 251/129.15 |
| 4,938,036 | 7/1990 | Hodgkins et al. | 62/323.1 |
| 4,957,085 | 9/1990 | Sverdlin | 123/467 |
| 4,978,148 | 12/1990 | Kosugi et al. | 285/133.1 |
| 4,984,549 | 1/1991 | Mesenich | 123/472 |
| 5,027,871 | 7/1991 | Guenther | 141/198 |

(List continued on next page.)

FOREIGN PATENT DOCUMENTS

| | | |
|---|---|---|
| 4224908 A1 | 2/1993 | (DE) . |
| 2 246988 | 2/1992 | (GB) . |
| WO 81/00282 | 2/1981 | (WO) . |
| WO 92/08886 | 5/1992 | (WO) . |
| WO 92/08888 | 5/1992 | (WO) . |

OTHER PUBLICATIONS

"Gasoline Fuel Injector" SAE J1832 NOV89, Report of the Fuel Injection Subcommittee, approved Nov. 1989, pp. 24.163–24.187.

Primary Examiner—Henry C. Yuen
Assistant Examiner—Mahmoud M Gimie
(74) Attorney, Agent, or Firm—Merchant & Gould P.C.

(57) ABSTRACT

Fuel line arrangement for a liquefied petroleum gas fuel injection system, and method. A fuel supply line provides flow between a fuel tank and a plurality of fuel injectors, and a fuel return line returns a portion of the supply fuel to the tank. The supply line is positioned within the return line so that return fuel substantially surrounds the supply line. Liquefied petroleum gas is vaporized within the return line under certain conditions, thereby cooling supply fuel. A novel Y-connector and bushing are also disclosed.

19 Claims, 4 Drawing Sheets

U.S. PATENT DOCUMENTS

| | | | |
|---|---|---|---|
| 5,033,444 | 7/1991 | Kaufman et al. | 123/527 |
| 5,044,339 | 9/1991 | Hafner | 123/456 |
| 5,046,702 | 9/1991 | Miyazawa et al. | 251/129.1 |
| 5,050,840 | 9/1991 | Kondo et al. | 251/129.15 |
| 5,076,242 | 12/1991 | Parker | 123/527 |
| 5,076,244 | 12/1991 | Donaldson | 123/527 |
| 5,085,402 | 2/1992 | O'Dell | 251/129.21 |
| 5,136,986 | 8/1992 | Jensen | 123/27 GE |
| 5,156,134 | 10/1992 | Tochizawa | 123/541 |
| 5,174,262 | 12/1992 | Staerzl | 123/456 |
| 5,183,209 | 2/1993 | Ricco et al. | 239/585.1 |
| 5,197,436 | 3/1993 | Ozawa | 123/456 |
| 5,233,963 | 8/1993 | Gregorius et al. | 123/456 |
| 5,237,981 | 8/1993 | Polletta et al. | 123/527 |
| 5,251,603 | 10/1993 | Watanabe et al. | 123/541 |
| 5,259,651 | 11/1993 | Sharp | 285/133.1 |
| 5,291,869 | 3/1994 | Bennett | 123/527 |
| 5,299,605 | 4/1994 | Bergamini et al. | 141/59 |
| 5,325,838 | 7/1994 | Bennett | 123/527 |
| 5,348,847 | 9/1994 | Chasteen et al. | 123/527 |
| 5,355,846 | 10/1994 | Ozawa | 123/41.21 |
| 5,377,645 | 1/1995 | Moore | 123/527 |
| 5,423,303 | 6/1995 | Bennett | 123/527 |
| 5,441,234 | 8/1995 | White et al. | 251/144 |
| 5,449,203 | 9/1995 | Sharp | 285/133.1 |
| 5,449,204 | 9/1995 | Greene et al. | 285/133.1 |
| 5,479,906 | 1/1996 | Collie | 123/525 |
| 5,533,486 | 7/1996 | Qutub | 123/541 |
| 5,547,231 | 8/1996 | Sharp | 285/133.1 |
| 5,566,712 | 10/1996 | White et al. | 137/587 |
| 5,595,160 | 1/1997 | Matsumoto et al. | 123/456 |
| 5,624,140 | 4/1997 | Allen et al. | 285/133.1 |
| 5,735,342 | 4/1998 | Nitta | 165/122 |

FUEL LINE ARRANGEMENT FOR LPG SYSTEM, AND METHOD

INCORPORATION BY REFERENCE

Applicant's U.S. Pat. Nos. 5,291,869; 5,325,838; and 5,423,303 are incorporated herein by reference.

FIELD OF THE INVENTION

This invention relates to liquefied petroleum gas fuel injection systems and more particularly to fuel line arrangements and cooling methods for such systems.

BACKGROUND OF THE INVENTION

Liquefied petroleum gas ("LPG") fuel supply systems are known, for example as shown in applicant's U.S. Pat. Nos. 5,291,869; 5,325,838; and 5,423,303. Such systems typically include a number of specialized fuel injectors which receive fuel from a high pressure tank. A fuel rail connected in line with a series of injectors is often employed to deliver fuel to the injectors. In many systems, uninjected fuel is returned to the fuel tank. This is generally done to keep the supply fuel as cool as possible, particularly where it is intended to inject LPG in liquid rather than gaseous form.

In LPG systems where uninjected fuel is returned to the fuel tank, separate supply and return fuel lines are employed in the art. More than one supply line and more than one return line are also often employed, with a separate supply and return line for each bank of fuel injectors.

There are many problems associated with having multiple supply and return lines in LPG systems. One is that the fuel in the supply line is exposed to heat from the engine and other sources, which causes undesirable vaporization. Another problem is that all of the lines must be very strong, typically having large wall thickness and requiring reinforcement, in order to withstand the very high pressures (sometimes over 300 psi) that can occur in LPG systems. Other problems involve safety and environmental concerns. Due to the large number of hose connections and the large amount of exposed fuel line, the possibility of fuel leaks is substantially increased.

What has been needed is a fuel line arrangement for LPG systems, and a method, that avoid these problems.

SUMMARY OF THE INVENTION

According to the present invention, a method of cooling supply fuel in an LPG system, and a fuel line arrangement for an LPG system, are provided.

In the method of the present invention, an LPG system having a plurality of fuel injectors, a fuel supply and a fuel return line, and a fuel tank, is provided. The supply and return lines are communicated with the tank, and the supply line is communicated with each of the fuel injectors. The supply line is positioned within the return line so that return fuel substantially surrounds the supply line. Under certain conditions, return fuel in the fuel return line is vaporized, thereby cooling supply fuel in the supply line.

In the apparatus, a fuel line arrangement for an LPG system includes a fuel supply line for connection between the fuel tank and a plurality of fuel injectors and a fuel return line for connection to the tank and for returning a portion of the supply fuel from the supply line to the tank. The supply line is positioned within the return line so that the return fuel substantially surrounds the supply line. A mechanism is provided for vaporizing LPG returning to the tank through the return line, thereby cooling supply fuel.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
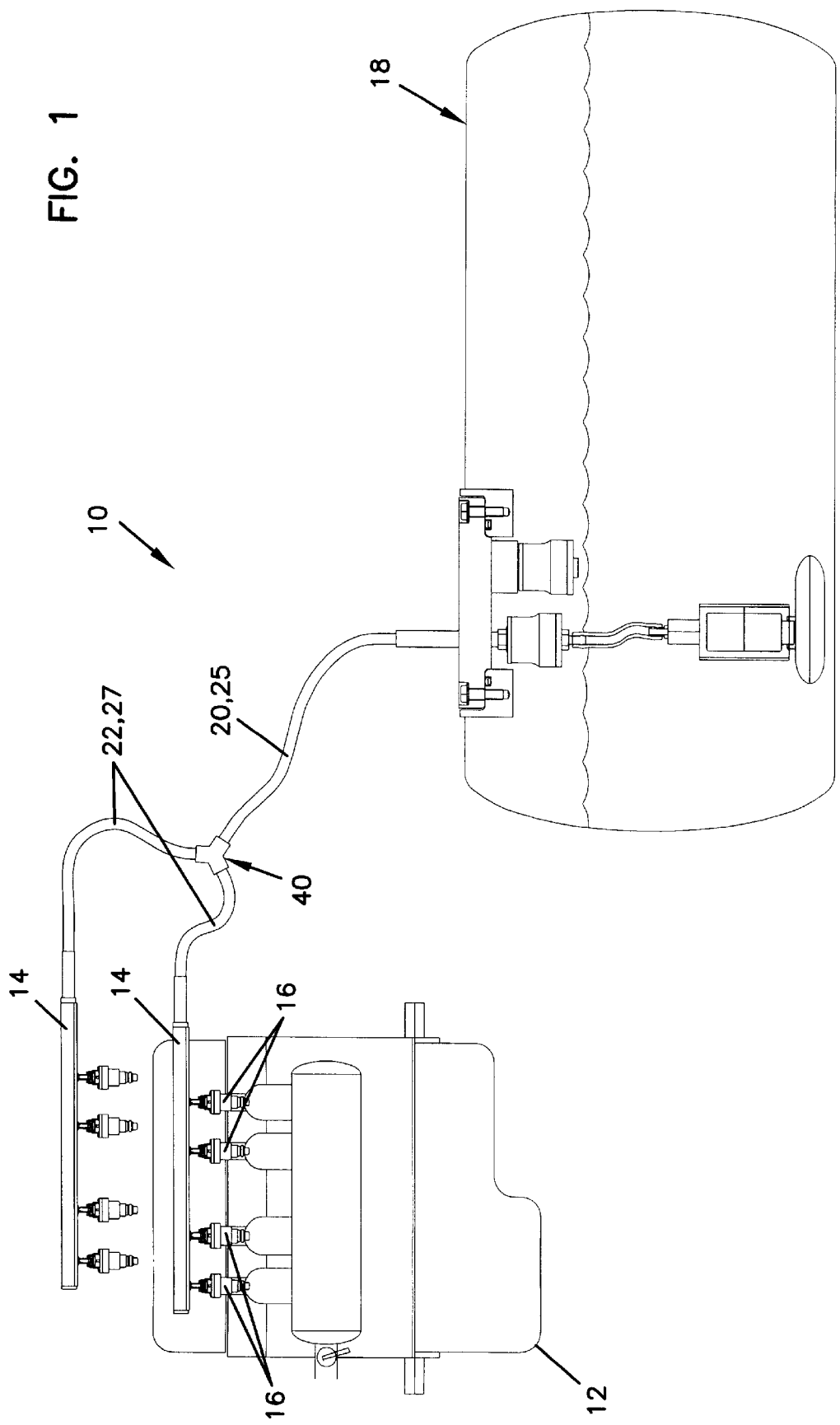
FIG. 1 is a schematic diagram of a system according to the present invention.

Referring now to the drawings, wherein like numerals designate like parts throughout the figures, a fuel supply system 10 for providing LPG to an internal combustion engine 12 is shown.

System 10 includes two fuel rails 14 which deliver fuel to a plurality of fuel injectors 16. Although fuel rails are shown in the preferred embodiment, they are not necessary within the principles of the invention; for example, separate supply lines branching from a main supply line could deliver fuel to each injector in parallel. Return fuel also need not come from each of the fuel injectors as is the case in the applicant's patented system incorporated above by reference.

Supply fuel from tank 18 is delivered to injectors 16 via primary 20 and secondary 22 supply lines, and return fuel is delivered back to tank 18 via secondary 27 and primary 25 return lines. A Y-connector 40, further discussed below, splits the primary lines 20, 25 into secondary lines 22, 27.

Figure 2:
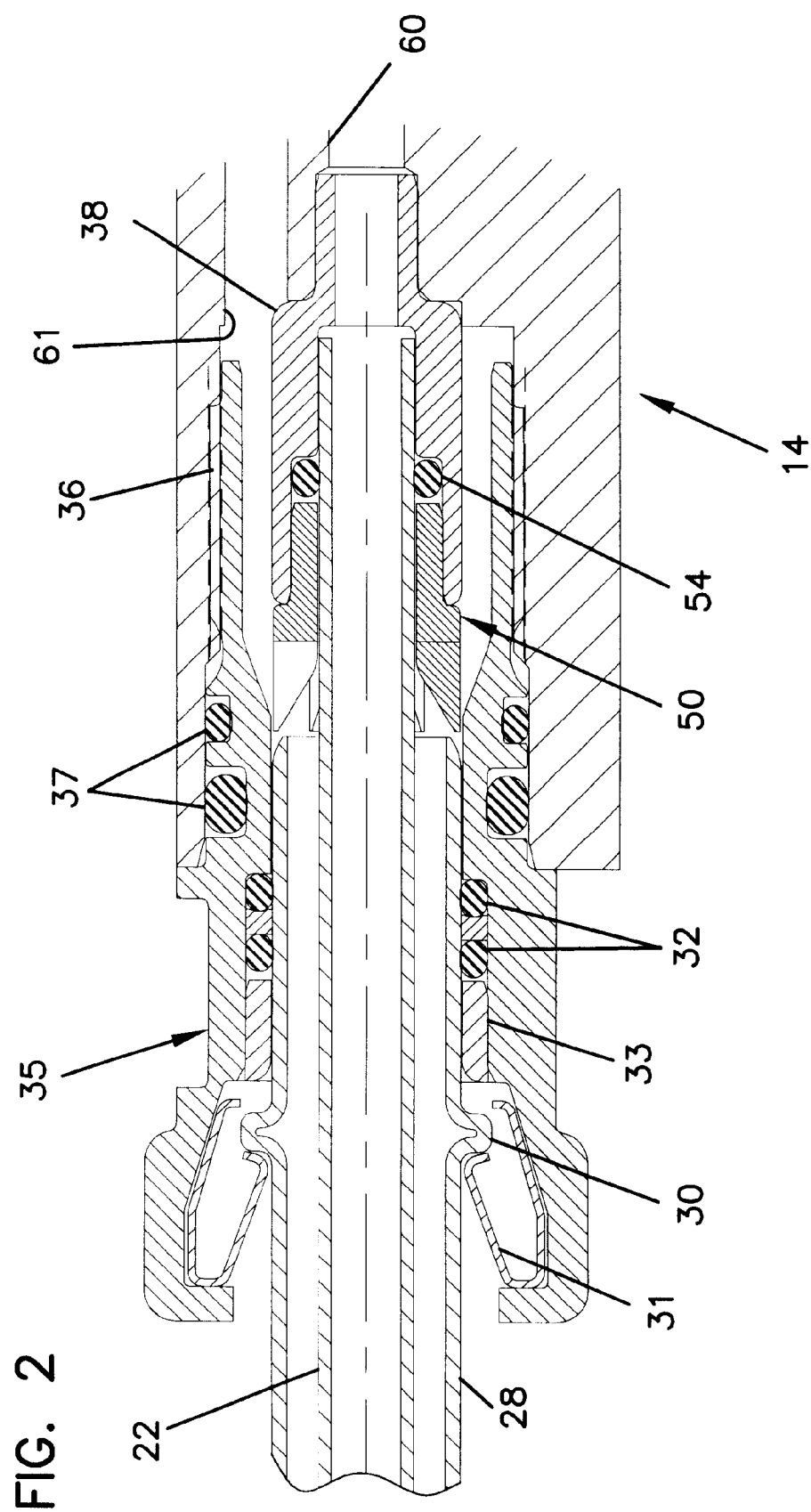
FIG. 2 is a cross-sectional view of a fuel line arrangement and a connection according to the present invention.
Figure 3:
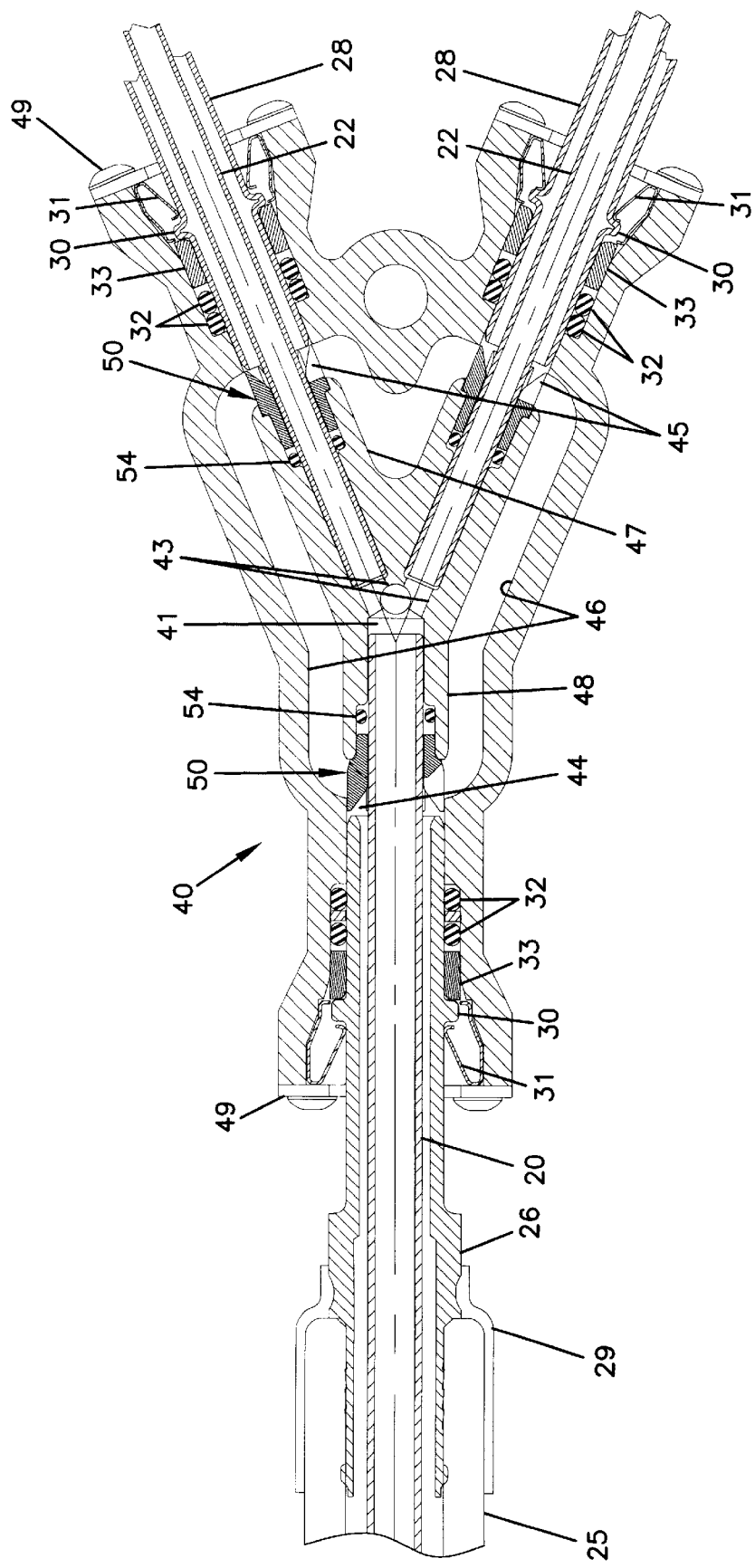
FIG. 3 is a cross-sectional view of a Y-connector according to the present invention.

The preferred fuel line arrangement is shown in FIGS. 2 and 3. Primary supply line 20 is positioned completely within primary return line 25, as is secondary supply line 22 with respect to secondary return line 27. Supply lines 20, 22 are not restrained axially within return lines 25, 27, but rather are only restrained by the inner walls of return lines 25, 27 along the length of the lines, thereby creating a generally concentric arrangement. The annular flow area of return lines 25, 27 is preferably about two or more times the annular flow area of the respective supply lines 20, 22 along the entire length of lines, including within fittings and connectors. Lines 20, 22, 25, 27 are made of nylon, but a high heat transfer metal such as aluminum may be preferable. Wall thicknesses are 0.025 and 0.035 inches for primary 20 and secondary 22 supply lines respectively, and 0.180 and 0.210 inches for primary 25 and secondary 27 return lines respectively. These relatively thin wall thicknesses for supply lines is sufficient because the pressure differential across the wall is only on the order of 30–70 psi as compared to the over 300 psi differential that would occur if supply lines were not contained within return lines. Arrangements other than the concentric fuel line arrangement shown and described herein could be employed within the principles of the invention, where the supply line is positioned within the return line so that return fuel substantially surrounds the supply line.

The concentric fuel line arrangement can be surrounded with an appropriate insulator in high heat areas such as the engine, transmission and exhaust, in order to minimize heat absorption. The preferred insulation is closed-cell foam rubber ¼ to ¾ inch thick.

The return fuel surrounding supply lines 20, 22 vaporizes or evaporates through thermodynamic phase change processes that are fully described in the applicant's patents incorporated by reference. As the temperature of return fuel increases, or its pressure decreases, the LPG tends to vaporize from a liquid to a gaseous state. This phase change extracts heat from supply fuel through the walls of supply line hoses 20, 22. Supply fuel is consequently cooled, thereby helping to maintain it in a liquid state prior to injection into the engine.

FIGS. 2 and 3 show the fuel line connections. Return hoses 25, 27 are connected to steel return fittings 26, 28 with steel collar 29, as shown in FIG. 3.

Return fittings 26, 28 are held in place by locking clips 31 bracing against retaining flanges 30, and can be further held in place by a device that resists rotation. O-rings 32 seal against the outer surface of return fittings 26, 28, and are held in place by pressed in sleeves 33. Supply hoses 20, 22 extend through bushings 50 and are sealed by O-rings 54. In the Y-connector shown in FIG. 3, the surrounding structure cast into the part holds the various components described above in place; end caps 49 additionally retain locking clips 31. In the fuel rail connection shown in FIG. 2, an aluminum fitting 35, connected to fuel rail 14 by threads 36, provides the structure which primarily holds in place the various components. Supply hose adapter 38, a plastic part press fit into fuel rail supply channel 60, also surrounds annular body 53 of bushing 50 and O-ring 54. Fitting 35 is sealed to fuel rail 14 via O-rings 37. The tank connection is the same as the primary Y connection. Any other necessary connections can be the same or similar to those shown in FIGS. 2 and 3.

Figure 4A:
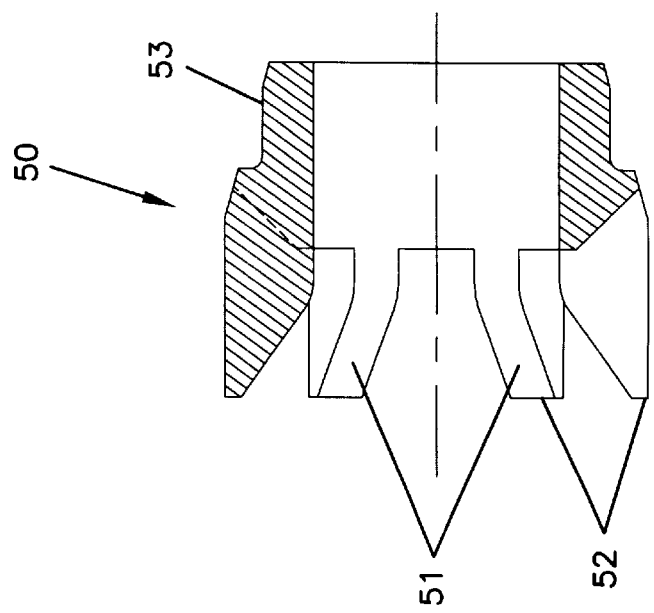
FIGS. 4A and 4B are plan and cross-sectional views, respectively, of a bushing according to the present invention.
Figure 4B:
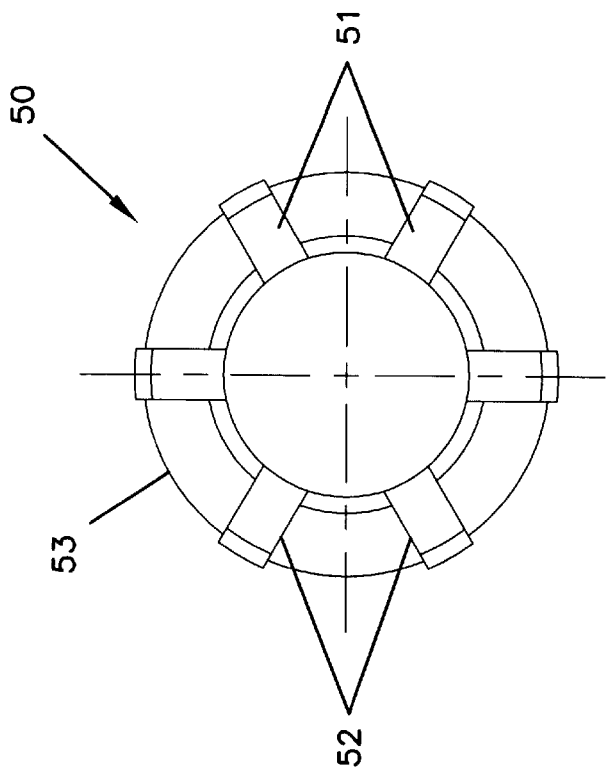

A novel aspect of the concentric fuel line connection is bushing 50. Bushing 50, best shown in FIGS. 4A and B, has circumferentially spaced fingers that serve two important functions. First, when supply lines 20, 22 are being inserted, ramped surfaces 51 guide the hose into annular body 53 to assure proper alignment and sealing. Second, the space between fingers 52 serves as a flow path for return fuel: in the Y-connector shown in FIG. 3, they permit flow between return lines 27, 28 and connecting return passages 46; and in the fuel rail connection shown in FIG. 2, they permit flow between fuel rail return channel 61 and secondary return line 27. Bushing 50 is made of a plastic compatible with LPB, such as nylon or acetal.

Another novel aspect of the present invention is Y-connector 40, which splits primary fuel lines 20, 25 into two secondary lines 22, 27. Primary supply hose 20 communicates with secondary supply hoses 22 via supply passage 42 and two secondary supply passages 43. Secondary return lines 27 communicate with primary return line 25 via connecting return passages 46; cross-connecting passage 47 also facilitates flow between connecting return passages 46. Y-connector is cast preferably from aluminum, but could also be cast from other metals such as brass. Internal webs (not shown) in connecting return 46 passages support internal Y 48. A connector such as 40 could be used in places other than at the fuel rails, wherever it is desirable to split a concentric fuel line arrangement into two or more concentric lines, as for example into separate lines for individual tanks or fuel injectors.

It should be understood that the present invention is not limited to the preferred embodiment discussed above, which is illustrative only. Changes may be made in detail, especially in matters of shape, size, arrangement of parts, and material components within the principles of the invention, to the full extent indicated by the broad general meanings of the terms in which the appended claims are expressed.

I claim:

1. A method of cooling supply fuel in a liquefied petroleum gas fuel injection system, comprising:
   providing a liquefied petroleum gas fuel injection system, said system having a plurality of fuel injectors, a fuel supply line, a fuel return line, and a fuel tank;
   communicating said fuel supply and return lines with said tank;
   communicating said fuel supply line with each of said fuel injectors;
   positioning said fuel supply line within said fuel return line so that return fuel substantially surrounds said supply line; and
   vaporizing return fuel in said fuel return line.

2. A method of cooling supply fuel according to claim 1, wherein the step of providing a system includes providing a fuel rail, and the step of communicating said fuel supply line with said fuel injectors includes connecting said supply line to said fuel rail, and in turn connecting said fuel rail to each injector.

3. A method of cooling supply fuel according to claim 2, further comprising communicating said fuel return line with said fuel rail.

4. A method of cooling supply fuel according to claim 3, further comprising communicating each of said fuel injectors with said fuel return line through said fuel rail.

5. A method of cooling supply fuel according to claim 1, further comprising communicating each of said fuel injectors with said fuel return line.

6. A method of cooling supply fuel according to claim 1, wherein the step of positioning said supply line within said return line includes arranging said supply line generally concentrically with said return line.

7. A method of cooling supply fuel according to claim 1, further comprising insulating a portion of said supply and return lines between said fuel tank and said fuel injectors with a heat insulating material substantially surrounding said fuel return line.

8. A fuel line arrangement for a liquefied petroleum gas fuel injection system, comprising:
   (a) a fuel supply line for connection between a fuel tank and a plurality of fuel injectors;
   (b) a fuel return line for connection to the tank and for returning a portion of the supply fuel to the tank;
   (c) said supply line positioned within said return line so that return fuel substantially surrounds said supply line; and
   (d) means for vaporizing liquefied petroleum gas returning to said tank through said return line.

9. A fuel line arrangement according to claim 8, wherein said vaporizing means comprises means for decreasing the pressure of the return fuel in said fuel return line.

10. A fuel line arrangement according to claim 8, wherein said vaporizing means comprises means for increasing the temperature of the return fuel in said fuel return line.

11. A fuel line arrangement according to claim 8, further comprising an insulating material substantially surrounding a portion of said fuel return line.

12. A fuel line arrangement according to claim 11, wherein said insulating material is closed-cell foam rubber.

13. A fuel line arrangement according to claim 8, further including a connector splitting said supply and return lines into a plurality of secondary supply and return lines, said secondary supply lines communicating with said fuel injectors.

14. A fuel line arrangement according to claim 13, said secondary supply and return lines comprising two generally concentric secondary supply and return lines connected to a plurality of fuel rails which in turn are connected to the fuel injectors.

15. A fuel line arrangement according to claim 13, said connector having supply and return fuel passages connected with said supply and return lines respectively and a plurality of secondary fuel supply and return passages communicating with said passages respectively and connected with said plurality of secondary supply and return lines respectively.

16. A fuel line arrangement according to claim 15, said connector further having a cross-connecting passage connecting said secondary return fuel passages together.

17. A fuel line arrangement according to claim 8, further including a bushing for connecting said supply and return lines with other structure in the arrangement, said bushing comprising a plurality of circumferentially spaced fingers configured to guide said supply line into an annular interior of said bushing and to permit return fuel to flow between said fingers.

18. A fuel line arrangement according to claim 17, wherein said bushing connects said supply and return lines with a fuel rail.

19. A fuel line arrangement according to claim 17, wherein said bushing connects said supply and return lines with a connector splitting said supply and return lines into a plurality of secondary supply and return lines.

* * * * *